US008618007B2

(12) United States Patent
Cabodi et al.

(10) Patent No.: US 8,618,007 B2
(45) Date of Patent: Dec. 31, 2013

(54) FUSED CAST REFRACTORY PRODUCT WITH A HIGH ALUMINA CONTENT

(75) Inventors: Isabelle Cabodi, Cavaillon (FR); Michel H G Gaubil, Les Angles (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 546 days.

(21) Appl. No.: 12/595,735

(22) PCT Filed: Apr. 22, 2008

(86) PCT No.: PCT/FR2008/050732
§ 371 (c)(1),
(2), (4) Date: Feb. 5, 2010

(87) PCT Pub. No.: WO2008/145924
PCT Pub. Date: Dec. 4, 2008

(65) Prior Publication Data
US 2010/0151232 A1    Jun. 17, 2010

(30) Foreign Application Priority Data

Apr. 23, 2007  (FR) .................................... 07 54635

(51) Int. Cl.
*C04B 35/05* (2006.01)
*C04B 35/107* (2006.01)

(52) U.S. Cl.
USPC ........ 501/118; 501/119; 501/120; 428/304.4; 65/374.13

(58) Field of Classification Search
USPC ..................................................... 65/374.13
See application file for complete search history.

(56) References Cited

U.S. PATENT DOCUMENTS

| 2,019,208 | A |   | 10/1935 | Baumann, Jr. et al. |
|---|---|---|---|---|
| 3,777,805 | A | * | 12/1973 | Racasens et al. ............... 165/9.1 |
| 5,005,635 | A | * | 4/1991 | Zanoli et al. .................... 165/9.1 |
| 5,028,572 | A | * | 7/1991 | Kim et al. ....................... 501/103 |
| 5,523,150 | A | * | 6/1996 | Numata et al. .............. 428/307.7 |
| 2002/0013212 | A1 |   | 1/2002 | Boussant-Roux et al. |
| 2002/0053417 | A1 |   | 5/2002 | Zanoli et al. |
| 2002/0103070 | A1 |   | 8/2002 | Toshihiro |
| 2007/0042896 | A1 |   | 2/2007 | Peascoe-Meisner et al. |

FOREIGN PATENT DOCUMENTS

| EP | 0 354 844 | 2/1990 |
|---|---|---|
| FR | 1.208.577 | 2/1960 |
| FR | 1.208.577 | 7/1961 |
| FR | 1.208.577 | 12/1963 |
| FR | 2.058.527 | 5/1971 |
| FR | 2.142.624 | 2/1973 |
| FR | 2 248 748 | 5/1975 |

(Continued)

OTHER PUBLICATIONS

Sokolov et al "Synthesis and properties of fusion cast refractories in the MgO Al2O3 system", Refractories and Industrial Ceramics, vol. 44, No. 5, Aug. 2003, pp. 35-329.*

(Continued)

*Primary Examiner* — Karl Group
(74) *Attorney, Agent, or Firm* — Oliff & Berridge, PLC (57) ABSTRACT

The invention provides a fused cast refractory product having the following mean chemical composition by weight, as a percentage by weight based on the oxides:
  25%<MgO<30%;
  70%<$Al_2O_3$<75%;
  other species: <1%.
The invention is applicable to a regenerator associated with a soda-lime glass fusion furnace operating under reducing conditions.

30 Claims, 3 Drawing Sheets

(56) References Cited

FOREIGN PATENT DOCUMENTS

| FR | 2 635 372 | | 2/1990 |
|----|-----------|---|--------|
| FR | 2 853 897 | | 10/2004 |
| JP | A-50-034569 | | 11/1975 |
| JP | A-53-050215 | | 5/1978 |
| JP | A-59-213677 | | 12/1984 |
| JP | A-10-226522 | | 8/1998 |
| JP | A-2002-037678 | | 2/2002 |
| JP | A-2002-211933 | | 7/2002 |
| SU | 1707006 | * | 1/1992 |
| WO | WO 01/92183 A1 | | 12/2001 |

OTHER PUBLICATIONS

T.S. Busby et al., "The effect of $SO_3$, $Na_2SO_4$ and $V_2O_5$ on the bonding minerals of basic refractories," Glass Technology, vol. 20, No. 2, pp. 67-69, Apr. 1979.

Feb. 16, 2012 Office Action issued in Russian Application No. 2009138527/03(054616) with English-language translation.

Oct. 16, 2012 Office Action issued in Japanese Patent Application No. 2010-504801 (with English-language translation).

* cited by examiner

FUSED CAST REFRACTORY PRODUCT WITH A HIGH ALUMINA CONTENT

FIELD OF THE INVENTION

The invention relates to a fused cast refractory product with a high alumina content and to the use of said product as an element in the construction of packing for regenerators, in particular in packing for glass furnace regenerators.

PRIOR ART

Refractory products include fused cast products and sintered products.

Sintered products are obtained by mixing suitable starting materials, then forming the mixture while green and firing the resulting green body at a temperature and for a time sufficient to sinter the green body.

The problems encountered with sintered products and with fused cast products in their respective applications, and the technical solutions adopted to overcome them, are generally different. Furthermore, because of the large differences in production methods, a composition that is developed to produce a sintered product is not, a priori, suitable unchanged for the production of a fused cast product, and vice versa.

Fused cast products, sometimes termed "electrofused products", are obtained by melting a mixture of appropriate starting materials in an electric arc furnace or by using any other technique which is suitable for such products. The fused liquid is then cast into a mold and the product obtained undergoes controlled cooling.

The majority of "flame" glass furnaces, i.e. using gas or fuel burners as the energy source, are equipped with regenerators. Such regenerators are a succession of chambers fitted with ceramic elements forming packing and allowing heat to be recovered and restored depending on the cycle. In general, hot gases or fumes that derive from an operating furnace enter the packing via the top portion of the regenerator and release their heat energy to the packing. During that period, cold air is supplied to the bottom of other packing heated during a preceding cycle to recover heat energy; that hot air leaves from the top of the packing where it is fed to the furnace burners to burn fuel under the best conditions. The elements that constitute the packing carry out that function in alternation and must thus have very good resistance to thermal shock.

The ceramic elements constituting the packing can have various shapes and are described in French patents FR 2 142 624, FR 2 248 748, and FR 2 635 372, for example.

The fused cast products employed to produce the packing elements are generally of an AZS (alumina-zirconia-silica) or aluminous type compositions.

Products containing large quantities of alumina, termed "aluminous products" are known to have the best resistance to high temperatures and are thus used mainly in the top portions of the packing.

However, major changes are taking place in the operating conditions used in glass furnaces. An example that may be mentioned is the increasing use of gaseous fuels as a substitution for oil type liquid fuels, in particular in glass furnaces for television screens. Furthermore, the operating conditions in soda-lime glass furnaces are changing towards conditions that are of a more reducing nature. Such changes in furnace operation render the fumes more aggressive towards the refractory products located in the regenerators. In particular, a phenomenon of corrosion of the lower portions of the packing is observed following deposition by condensation of alkaline species specific to operation in a reducing atmosphere (in particular NaOH, KOH in the free form, etc). Current aluminous or AZS type refractory products do not have sufficient resistance to that type of challenge.

Further, United States patent US-A-2 019 208, filed on Dec. 16, 1933, describes alumina-magnesia refractory products comprising 2% to 10% of magnesia and with good resistance to thermal variations. However, such products suffer from industrial feasibility problems.

In addition, SEPR produces and markets the product ER5312RX which contains about 87.5% of $Al_2O_3$, 4.5% of $Na_2O$ and 8% of MgO. Crystallographic analysis of ER5312RX reveals mainly beta triple prime alumina. While that product has excellent resistance to corrosion by alkaline vapors, it would be advantageous if its behavior could be further improved under certain highly demanding operating conditions, in particular in reducing atmospheres, i.e. containing and excess of CO and alkalines, i.e. containing NaOH vapor.

FR-A-2 853 897 describes fused cast aluminous refractory products containing 0.4% to 2.5% of magnesia. Such products offer improved resistance to corrosion by alkaline species, but their behavior is still unsatisfactory under certain conditions, in particular under reducing conditions, i.e. containing excess CO and alkalines, i.e. containing NaOH vapor.

Thus, there is a need for a novel fused cast refractory product with enhanced resistance to corrosion by alkaline condensates, and more particularly to condensates of the free NaOH type, and which has good resistance to thermal variations.

The present invention aims to satisfy this need.

SUMMARY OF THE INVENTION

More particularly, the invention provides a fused cast refractory product having the following mean chemical composition by weight, as percentages by weight based on the oxides:
  25%<MgO<30%;
  70%<$Al_2O_3$<75%;
  other species: <1%.

As can be seen in more detail in the remainder of the description, the refractory products of the invention have high resistance to alkaline corrosion and to thermal shocks. They are thus ideal for use in a regenerator for a glass furnace operating under reducing conditions, in particular to constitute elements of the packing.

Preferably, the product in accordance with the invention also includes one or more of the following optional characteristics:
  the "other species" are impurities, in particular $Na_2O$, CaO, $SiO_2$, and $Fe_2O_3$;
  the oxides represent more than 99.9% of the weight of the product, preferably about 100% of the weight of the product;
  the $Al_2O_3$ content is such that 70.5%<$Al_2O_3$ and/or $Al_2O_3$<74%, or $Al_2O_3$<73%;
  the MgO content is such that 26%<MgO or 27.5%<MgO and/or MgO<29%;
  the $SiO_2$ content is such that $SiO_2$<0.5%, preferably $SiO_2$≤0.2%, or even $SiO_2$≤0.15%;
  the CaO content is such that CaO<0.6%, preferably CaO≤0.4%;
  the $Na_2O$ content is such that $Na_2O$<0.4%, or $Na_2O$≤0.2%;
  the total porosity is more than 10%, preferably more than 15% and/or less than 30%, preferably less than 25%;

the porosity of the product is constituted by pores; at least some, and preferably substantially all of said pores are tubular in shape;

said tubular pores have a preferential orientation;

the preferential orientation of the tubular pores is in a direction substantially perpendicular to the solidification front (or parallel to the direction of advance of the solidification front); for products having branches of thickness that is small relative to their length and height, the tubular pores within the branches thus have a preferential orientation in a direction perpendicular to the side faces of the branches, which are preferably intended to come into contact with the gas streams;

the diameter of the tubular pores lies in the range 1 millimeter [mm] to 5 mm; in particular, where appropriate, in the branches of the product;

the diameter of more than 80% by number of the tubular pores is less than 2 mm;

the product comprises more than 97% by weight of spinel;

said spinel is preferably in the form of columnar crystals of spinel;

said columnar crystals of spinel have a preferential orientation;

the preferential orientation of the crystals is in a direction substantially perpendicular to the solidification front;

the size of the spinel crystals, in particular away from the skin, is more than 0.1 mm and may attain 15 mm;

the spinel crystal size increases with distance from the skin of the product, i.e. from its outer surface;

the product includes at least three branches;

the product comprises a plurality of branches of height (h) that is in the range 100 mm to 600 mm, and/or of length (l) that is in the range 10 mm to 600 mm, and/or of thickness (e) that is in the range 15 mm to 60 mm, preferably in the range 20 mm to 50 mm, the height, and/or length, and/or thickness possibly being different depending on the branch under consideration;

the pores are distributed homogeneously in the branches of the product;

the product in accordance with the invention is constituted by a monolith;

the product in accordance with the invention is cruciform;

the product weights more than 1 kg, preferably more than 5 kg;

the product is produced from a mold which is necessarily in a plurality of parts;

at least some of the surfaces of the product in accordance with the invention that are to be placed at the interface with hot gases or fumes, and preferably all of said surfaces, exhibit obstacles or "corrugations".

The invention also provides a method of producing a refractory product in accordance with the invention, comprising the following steps in succession;

a) mixing starting materials to form a starting charge;
b) fusing said starting charge to obtain a molten material;
c) casting and solidifying said molten material by cooling, to obtain a refractory product;

said method being remarkable in that said starting materials are selected in such a manner that said refractory product is in accordance with the invention.

Preferably, the oxides MgO and $Al_2O_3$ are added systematically and methodically in such a manner as to guarantee the amounts required to obtain a product in accordance with the invention.

Preferably, the bath of molten material is agitated before being cast into the mold, in particular by the action of an electric arc or by bubbling through an oxidizing gas.

The invention also provides the use of a refractory product in accordance with the invention in a regenerator, in particular in a regenerator for a glass furnace, and more particularly as a packing element in a packing of such regenerators. Preferably, the product in accordance with the invention is used as an element in the part of said packing through which the cooled gases or fumes exit the packing and/or through which air to be heated enters into said packing. Preferably, the product is used as an element in the lower portion of said packing.

In particular, the invention provides the use of a refractory product in accordance with the invention as a packing element for a regenerator associated with a soda-lime glass fusion furnace operating under reducing conditions.

BRIEF DESCRIPTION OF THE FIGURES

Other characteristics and advantages of the invention become apparent from the following description and from an examination of the accompanying drawings in which.

DEFINITIONS

The term "alkaline corrosion" means corrosion resulting from the condensation of alkaline gases. An example that may be mentioned is corrosion due to fumes from melting soda-potash glass which, when the sulfur content in the fumes is low and/or the conditions are reducing, give rise to a phenomenon of condensation of species such as NaOH or KOH in the lower portion of the packing. The absence of sulfur or reducing conditions prevents the formation of species such as $Na_2SO_4$ or $K_2SO_4$. A phenomenon of liquid phase corrosion of the refractory products is thus observed.

The term "impurities" means inevitable constituents that are necessarily introduced with the starting materials or that result from reactions with those constituents. The impurities are not necessary constituents but are merely tolerated.

The term "pore size" means its maximum dimension. Pore size is measured by analyzing images of the surface of the products.

Crystal "size" is defined by its largest dimension measured in the plane of observation of a polished section.

The "lower portion" of a regenerator packing means the 5 to 15 lower stages, i.e., the lowest stages, of a packing. In general, the lower portion is considered to be constituted by the 10 lower stages of the packing.

The "skin" is the outer portion of the product that is in contact with the mold and which extends over a thickness of about 250 µm.

A "molten material" is a liquid mass. The liquid mass may contain some solid particles, but in a quantity which is not sufficient for them to be able to endow said mass with structure. In general, the quantity of solid particles (heterogeneous nucleation) is less than 5% by weight, most often less than 2% by weight.

Unless otherwise mentioned, the percentages used in the description and in the claims always refer to a percentage by weight based on the oxides.

DETAILED DESCRIPTION OF AN IMPLEMENTATION

A product in accordance with the invention may be manufactured using methods in routine use for the manufacture of fused cast refractory ceramics material. The methods described in FR-A-1 208 577 or FR-A-2 058 527, incorporated by reference, are applicable. In particular, the method may comprise above steps a) to c).

In step a), the starting materials are selected in a manner so as to guarantee the oxide contents in the finished product in accordance with the invention.

In step b), melting is preferably carried out by the combined action of a fairly long electric arc which does not produce reduction, and stirring encouraging re-oxidation of the products.

To minimize the formation of nodules with a metallic appearance and to avoid the formation of cracks or crazing in the finished product, melting is preferably carried out under oxidizing conditions.

Preferably, an electric arc melting method is used, for example the long arc melting method described in French patent FR-A-1 208 577 and its patents of addition, numbers 75893 and 82310, incorporated by reference.

That method consists in using an electric arc furnace in which the arc strikes between the charge and at least one electrode that is separate from the charge, and adjusting the length of the arc so that its reducing action is reduced to a minimum, while maintaining an oxidizing atmosphere above the molten material and agitating said molten material, either by the action of the arc itself or by bubbling through an oxidizing gas (for example air or oxygen). The molten material is then cast into a mold, preferably in a single casting operation. The casting operation preferably lasts less than 30 seconds, more preferably less than 20 seconds, in particular to produce regenerator packing elements. Substantially all of the molten material cast into the mold, generally at least 90%, or even at least 95% by weight, is still molten at the end of the casting operation.

Preferably the mold is made of metal, and preferably cooled, so as to obtain a high solidification rate and a high gradient of temperature between the core and the exterior surface of the product.

Casting a molten material advantageously allows complex shapes to be manufactured; the liquid molten material can fill any recesses that, for example, are destined to produce corrugations or reliefs on the surface of the finished product. Casting a molten material also allows products having several branches to be manufactured.

The low viscosity of the molten material means that it can fill the mold properly, completely filling all of the irregularities or recesses of the mold. It is thus advantageously possible to produce portions in relief of small dimensions in reliable manner. Further, the product has a clean shape.

A molten material also means that products can be manufactured with low porosity, typically with porosity of less than 30%, preferably less than 25%.

Casting a molten material also means that molds can be used that have at least one profile in section that differs from a flared profile or a straight profile. In particular, it means that molds can be used that do not allow the solid product to exit via the opening of the mold through which the molten material was introduced, i.e. molds that are necessarily in a plurality of parts.

Preferably, the mold is in a plurality of parts. Advantageously, this means that portions in relief and recesses can be created on the surface of the finished product, and more advantageously on any one of the faces or even on all of the faces of the finished product.

In step c), the product may be unmolded before the molten material that has been introduced into the mold has solidified completely. Advantageously thereby, cooling and solidification continue more uniformly, optionally in an annealing furnace.

Preferably, unmolding is carried out less than 1 hour, preferably less than 30 minutes, preferably less than 5 minutes after casting the molten material into the mold.

In particular, in a cross sectional plane, the solidification front preferably has an outline of a shape that is substantially identical to that of the outline of the product, especially at the periphery of the product. As an example, for a cruciform product, the solidification front preferably has a shape that is also cruciform in a transversal cross sectional plane.

A rapid cooling in the mold, then a rapid unmolding before complete solidification, preferably less than 5 minutes after casting the molten material into the mold, advantageously leads to the formation of columnar cristals with a preferential orientation in a direction substantially perpendicular to the solidification front, in particular with the above described products comprising several branches.

Preferably, the cavity of the mold used is complementary in shape to the shape of the product that is to be fabricated. The fabricated product is thus monolithic, i.e. it is constituted by a single fused part with no adhesive, no cuts, and no assembly.

Figures 1, 2:
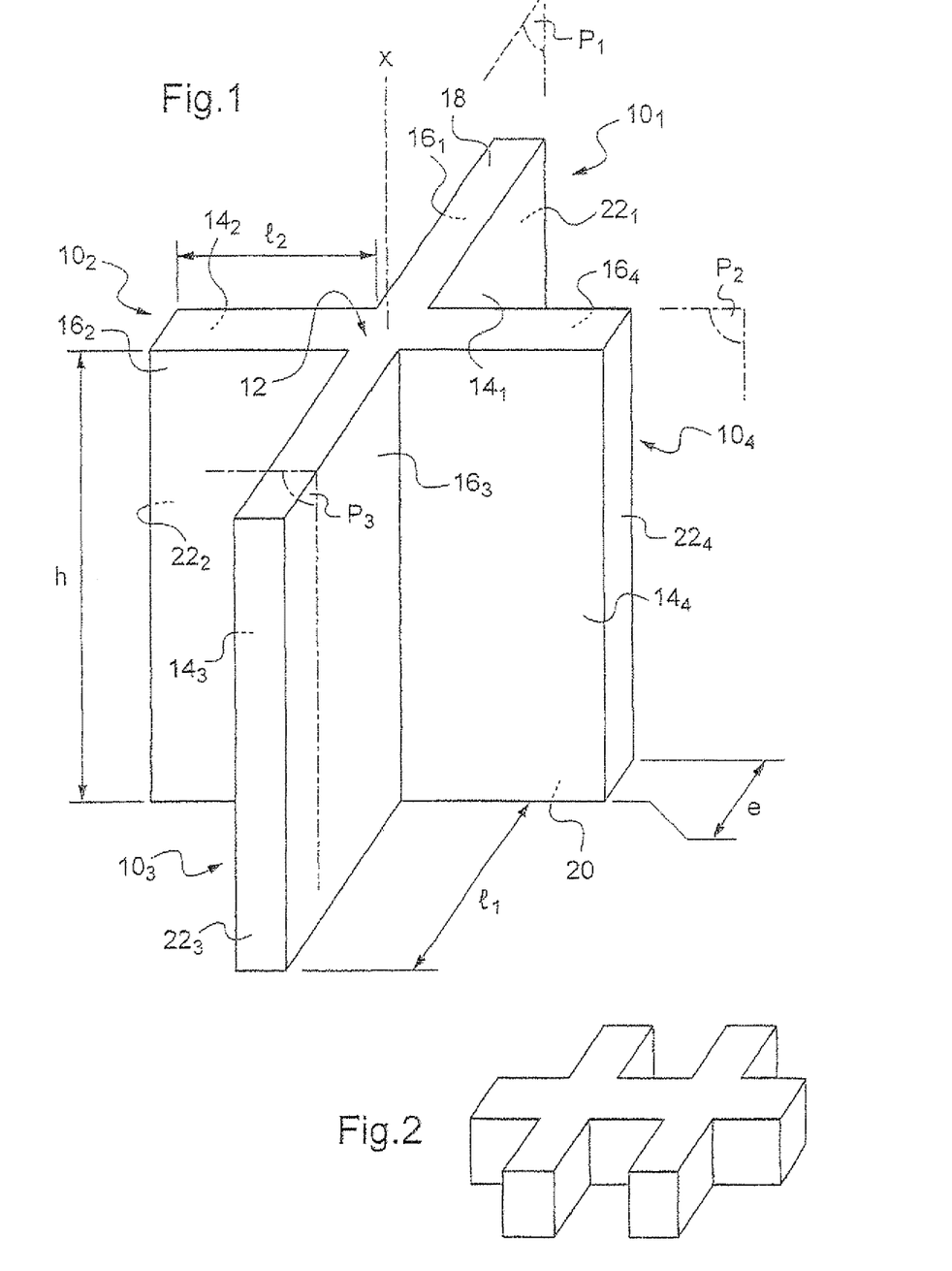
FIGS. 1 and 2 are perspective views of examples of refractory products of the invention.

As can be seen in FIG. 1, the product in accordance with the invention may be cruciform, i.e. comprise four branches or "wings", $10_1$, $10_2$, $10_3$, and $10_4$.

Preferably, the four branches $10_1$, $10_2$, $10_3$, and $10_4$ radiate from a central hub 12 of axis X, preferably forming pairs at right angles, branches $10_1$ and $10_3$ extending in a plane P1, and branches $10_2$ and $10_4$ extending in a plane P2 that is orthogonal to plane P1.

In the remainder of the description, an index i is used to generically designate the corresponding portions of the four branches $10_i$: $10_1$, $10_2$, $10_3$, and $10_4$.

Preferably, each branch has the general shape of a rectangular parallelepiped. The side faces $14_i$ and $16_i$ of the branches that are to be placed at the interface with the streams of gaseous fluid passing through the regenerator are preferably substantially parallel to the axis X.

The length "l" of the branches may be lie in the range 10 mm to 600 mm and the branch length may be different from one branch to another. In particular, the length "$l_1$" of branches $10_1$ and $10_3$ extending in plane P1 may differ from the length "$l_2$" of branches $10_2$ and $10_4$ extending in plane P2. The length "$l_2$" is preferably more than 1.5 times the length "$l_1$" and/or less than 3 times, or even less than 2.5 times the length "$l_1$". In particular, the ratio between the length "$l_2$" and the length "$l_1$" may be about 2.

The cruciform shape described above has proved to be particularly advantageous in facilitating operations of assembling packing, and also in ensuring that the packing is statically stable.

In one embodiment that is not shown, the side faces $14_i$ and $16_i$ of the various branches are provided with obstacles or "corrugations", preferably of the type described in EP-A-0 354 844, incorporated by reference. Advantageously, these obstacles can intensify exchanges between the refractory products of the invention and the gases moving in the regenerator.

The height "h" of the branches is preferably the same regardless of the branch under consideration. It is preferably in the range 100 mm to 600 mm.

Similarly, the thickness "e" of the branches is preferably identical regardless of the branch under consideration. Preferably, the thickness "e" is more than 15 mm, more preferably more than 20 mm and/or less than 60 mm, still more preferably less than 50 mm.

Preferably, the top surface 18 and bottom surface 20 of the product in accordance with the invention are substantially parallel and perpendicular to the side faces $14_i$ and $16_i$, and also preferably are substantially perpendicular to the end faces $22_i$ of the branches $10_i$.

While the cruciform shape described above is preferred, the invention is not limited to this shape. In particular, the product of the invention may have a "double cruciform" shape as shown in FIG. 2. This shape corresponds to joining, via the end faces $22_k$, two of the cruciform products as shown in FIG. 1. Preferably, such a product is, however, obtained by molding in a mold with a double cruciform cavity.

Other shapes may also be envisaged. In particular, the product in accordance with the invention may be tubular in shape, the sides of the product defining a shape in cross section, i.e. in a plane perpendicular to the direction of gas flow, that is square, pentagonal, hexagonal, or octagonal, for example. The thickness in cross section is preferably substantially constant along a side of the product.

Preferably, the ratio h/e of the height to the thickness of at least one side, preferably all of the sides of the product and/or of at least one branch, preferably all of the branches, is more than 5, preferably more than 8, more preferably more than 10.

Also preferably, the ratio l/e of the length to the thickness of at least one side, preferably all of the sides of the product and/or of at least one branch, preferably all of the branches, is more than 2, preferably more than 3.

Table 1 below summarizes test results. The test products tested, which are non-limiting, are given with the aim of illustrating the invention.

The following starting materials were used:
type AC44 alumina sold by Pechiney and containing a mean of 99.5% of $Al_2O_3$ ($Na_2O$: 3700 parts per million (ppm), $SiO_2$: 100 ppm, CaO: 160 ppm, $Fe_2O_3$: 120 ppm);
type AR75 alumina sold by Pechiney and containing a mean of 99.4% of $Al_2O_3$ ($Na_2O$: 2700 ppm, $SiO_2$: 100 ppm, CaO: 160 ppm, $Fe_2O_3$: 110 ppm);
NEDMAG 99 magnesia containing more than 99% of MgO, sold by Nedmag Industries.

The mixtures of the starting materials were melted using a conventional arc furnace melting method as described, for example, in FR-A-1 208 577 or in FR-A-2 058 527, then cast into a mold (for example using the method described in FR-A-2 088 185) to obtain X4 type parts suitable for acting as regenerator elements. These parts have a four-branched cruciform shape, each branch having a height of 420 mm, a length of 130 mm, and a thickness of 30 mm.

The mean chemical analysis of the products obtained is given in Table 1 as a percentage by weight based on the oxides.

The term "others" denotes any species other than $Al_2O_3$, MgO, $SiO_2$, $Na_2O$, CaO, and $SiO_2$.

The part of Example 1 of Table 1 is the product ER1682RX, manufactured and sold by SEPR. It contains about 50% of $Al_2O_3$, 32.0% of $ZrO_2$, and 15.6% of $SiO_2$. Crystallographic analysis thereof reveals about 47% of corundum, 21% of vitreous phase, and 32% of zirconia. The part of Example 2 of Table 1 is the product ER5312RX mentioned in the introduction of the description.

Example 3 contains 97.6% of $Al_2O_3$, 1.7% of MgO, and 0.5% of $SiO_2$. Its crystallographic analysis reveals about 6% of spinel, 1% of vitreous phase and 93% of corundum.

TABLE 1

| Part | $Al_2O_3$ + "others" | MgO | $SiO_2$ | $Na_2O$ | CaO | $ZrO_2$ | Number of defect(s) | Porosity | Test A | Test B | Test C |
|---|---|---|---|---|---|---|---|---|---|---|---|
| 1* | 51.30 | 0.00 | 15.60 | 1.10 | | 32.0 | 0 | 14 | S, F | D | C |
| 2* | 87.50 | 7.5 | 0.5 | 4.5 | | | 0 | 14 | F | C | D |
| 3* | 97.6 | 1.7 | 0.5 | 0.2 | | | 0 | 20 | S | D | I |
| 4* | 75.2 | 24.6 | 0.18 | 0.17 | 0.22 | 0.05 | 1 | ND | S | ND | ND |
| 5 | 73.2 | 26.3 | 0.10 | 0.10 | 0.2 | <0.05 | 1 | 15 | A | ND | I |
| 6 | 72.4 | 27.5 | 0.13 | 0.15 | 0.24 | <0.02 | 0 | 16 | A | ND | I |
| 7* | 71.4 | 27.5 | 0.8 | 0.05 | 0.25 | 0.05 | 0 | ND | S | ND | D |
| 8 | 72.0 | 27.6 | 0.07 | 0.09 | 0.3 | 0.1 | 0 | 21 | A | A | I |
| 9 | 71.6 | 28.1 | <0.05 | <0.05 | 0.23 | 0.20 | 0 | 31 | A | A | I |
| 10 | 71.1 | 28.6 | <0.02 | <0.02 | 0.24 | 0.05 | 0 | 26 | A | ND | I |
| 11 | 70.1 | 28.9 | <0.02 | <0.02 | 0.24 | 0.05 | 0 | ND | A | A | I |
| 12 | 70.4 | 29.3 | <0.02 | 0.07 | 0.25 | 0.01 | 1 | 15 | A | ND | I |
| 13 | 70.2 | 29.5 | <0.02 | 0.06 | 0.25 | <0.01 | 1 | 18 | A | ND | I |
| 14 | 69.7 | 30.0 | <0.02 | 0.05 | 0.24 | <0.01 | 1 | 13 | A | ND | I |
| 15* | 68.7 | 31.0 | <0.02 | 0.03 | 0.26 | 0.05 | 5 | 34 | ND | ND | I |

*not within the scope of the invention.

For each example, a feasibility indicator was produced by counting the number of defects (cracks and/or broken corners). Feasibility was considered to be acceptable if one or fewer defects were observed.

To simulate the application and the corrosive atmosphere in the presence of a temperature gradient, samples (dimensions 15×30×80 mm) were removed from the cruciform parts and then evaluated using the following test A: the samples were placed in a three meter long flame furnace with a temperature gradient along that length that changed from 1300° C. (burner side) to 700° C. (extraction duct side), and that was intended to reproduce the variation between the bottom and the top of a regenerator packing. The samples were placed in the alkaline species condensation zone. An alkaline solution containing 10% (by weight) of $Na_2SO_4$ was continuously injected (one liter per hour) to reproduce the alkaline atmosphere.

The letter indicates the visual appearance of the product after the test: S corresponds to swelling (increase in volume of more than 5%) of the sample, F corresponds to the appearance of cracks, and A indicates an absence of swelling or cracking, and thus corresponds to good behavior. ND means "not determined" and corresponds to samples that did not undergo test A.

The aptitude to thermal variations in a sample is determined using test B that consists in subjecting samples that had already undergone test A to 50 thermal cycles. Each cycle comprised raising the temperature from 900° C. to 1350° C. then returning to 900° C. The letter indicates the visual appearance of the product after the test: D indicates disintegration of the sample, C corresponds to the presence of cracks, and A indicates an absence of cracking and thus corresponds to good behavior. ND means "not determined" and corresponds to samples that did not undergo test B.

The corrosion resistance of the parts to extreme use and/or over the very long term was determined by quenching samples (dimensions 15×15×100 mm) in pure liquid NaOH at 980° C. (test C). The letter indicates the visual appearance of the product after 20 minutes of the test: I corresponds to an intact sample, D indicates the onset of degradation, and C corresponds to complete destructuring of the material.

The following points can be established from Table 1:

When the magnesia content (MgO) is more than 30%, feasibility is no longer guaranteed. This is probably due to the formation of a periclase phase (free magnesia). The feasibility is particularly good for magnesia contents in the range 27.5% to 29%.

It can also be observed (Example 4*) that when the magnesia content is less than 26%, the resistance to test A was substantially degraded. This degradation is probably due to the lower spinel content, to the advantage of the free corundum that, on use, can degrade more rapidly.

The products of the invention are the only products to exhibit good behavior for both tests A and C.

Without wishing to be bound by this theory, the remarkable behavior of the products of the invention could be explained by low ionic conductivity, linked to the presence of a large quantity of spinel crystals. The spinel crystals would in fact be chemically transferred less readily than the corundum crystals. Furthermore, the shape of the crystals (columnar crystals) as well as the arrangement of the crystals (overlapping crystals) within the parts would induce excellent cohesion thereof, even after chemical attack.

It can also be observed (Example 7*) that the quantity of species other than $Al_2O_3$ and MgO, in particular the silica content, must be limited since these other species result in degradation of the results in tests A and C.

The part of Example 8 was sawn along the sectional planes P1, at mid-thickness, and P3. The photographs of FIGS. 3 and 4 were taken of these sections. The photographs show that the refractory product has a microstructure that is remarkable.

Figure 3:
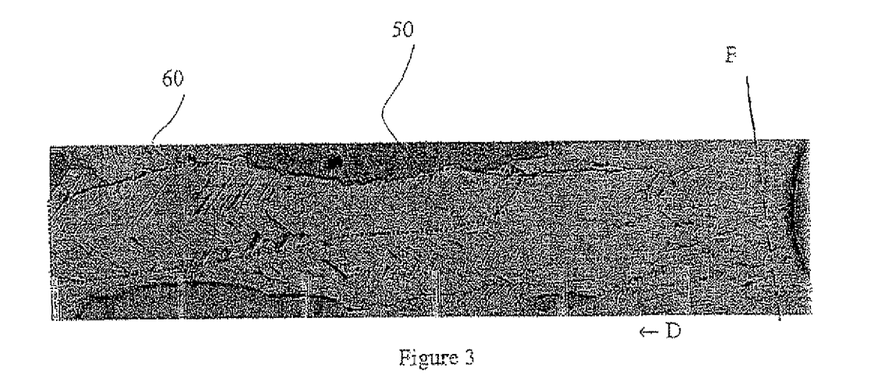
FIG. 3 is an optical microscope (Reichert Polyvar 2) image of a cross section along the plane P3 shown in FIG. 1, at mid-height, from the skin (on the right in FIG. 3) towards the core of a refractory product in accordance with the invention, the length of each vertical white line corresponding to 500 micrometers (µm)

As can be seen in FIG. 3, the product includes pores 50 that are elongate in shape, termed "tubular", the total porosity preferably being more than 10% and less than 25%. The diameter of the tubular pores varies from 1 mm to 5 mm in the branches of the product, i.e. away from the shrinkage cavity 52 (which extends substantially along the axis X of a cruciform product such as that of FIG. 1) and away from the peripheral zone corresponding to the skin of the product. More than 80% by number of the tubular pores have a diameter of less than 2 mm.

Figure 4:
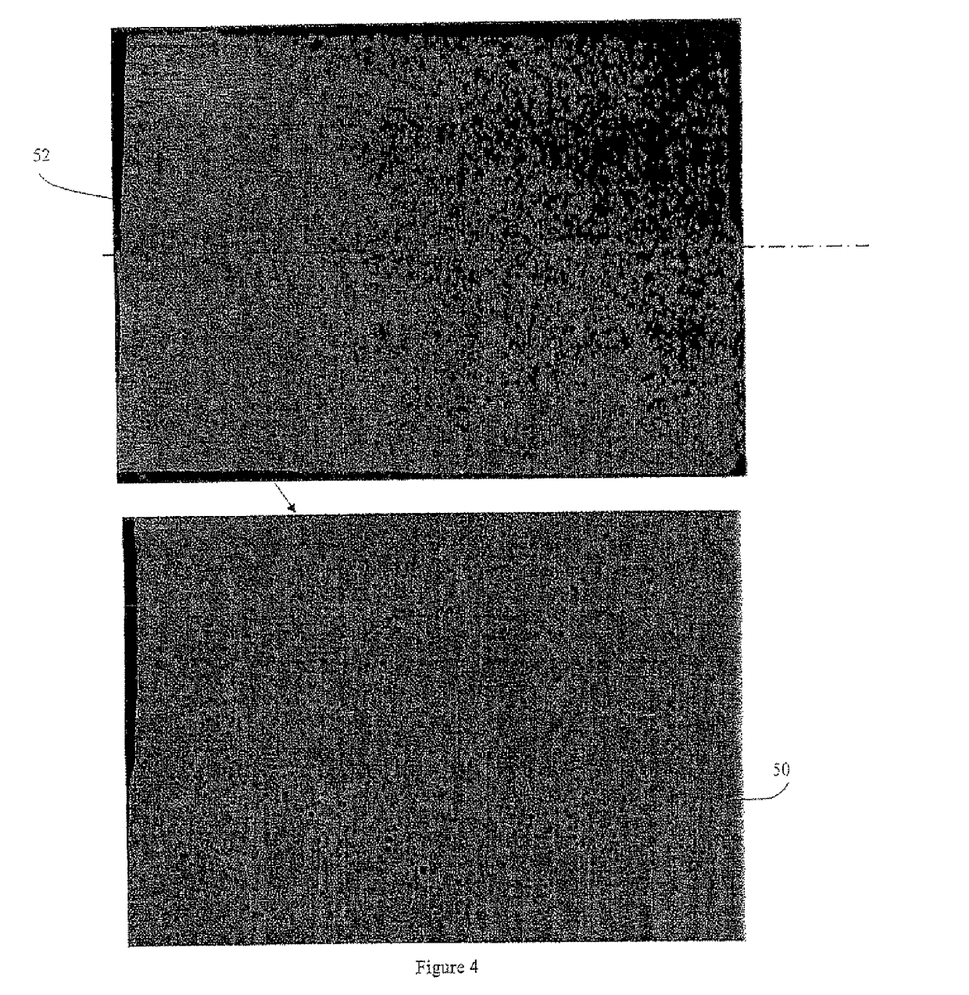
FIG. 4 is a photograph of a longitudinal section along the plane P1 shown in FIG. 1 of a refractory product in accordance with the invention, the section passing via the two branches $10_1$ and $10_3$, and via the central hub 12, together with a detail of this photograph.

Surprisingly, the tubular pores have a preferential orientation in a direction substantially perpendicular to the general direction F of the solidification front (and parallel to the direction D of advance of this solidification front). With products having branches that are thin relative to the length and height, the tubular pores within the branches thus have a preferential orientation in a direction perpendicular to the side faces $16_i$ of the branches. As can be seen in FIG. 4, the tubular pores are distributed throughout the bulk of the branches, except in the zone of the skin. This distribution is substantially homogeneous.

Further, FIG. 3 shows that the product includes columnar crystals 60 of spinel. It can be seen that the crystals of columnar spinel have a preferential orientation and extend in the same preferential orientation as the tubular pores 50, i.e. in a direction substantially perpendicular to the general direction F of the solidification front. The size of the spinel crystals in the branches, away from the skin, is more than 0.1 mm and may attain 15 mm. The size of the spinel crystals increases with distance from the outer surface of the product.

FIG. 4 also shows that filling is good, i.e. an absence of voids (a void being an empty space at least one dimension of which is greater than 15 mm), within the part.

In general, the porosity of the products of the invention lies in the range 10% to 30% and is distributed in a quasi-uniform manner in the part. Preferably, the porosity lies in the range 15% to 25%. A porosity of about 20% is considered to be optimal.

The pore volume and the homogeneous distribution of this pore volume advantageously allows the products of the invention to effectively accommodate variations in volume due to variations in temperature, even after being subjected to alkaline atmosphere operating conditions.

In general, it can also be observed that the pores are of small dimensions (of the order of 1 mm to 5 mm in diameter and of the order of 1 mm for the majority of pores).

Crystallographic analysis of the products of the invention of Examples 6, 8, and 9 reveals more than 97% of $Al_2O_3$—MgO spinel, the spinel crystals having, away from the skin, a size in the range 100 µm to 15 mm.

Example 13 is mainly constituted by spinel as well as traces of a second phase (periclase). The presence of these two phases is deleterious to feasibility; they behave differently during the cooling phase and may result in cracks.

The presence of compounds other than the inevitable impurities is undesirable. In particular, $Na_2O$, CaO, $B_2O_3$, $K_2O$, $Cr_2O_3$, $TiO_2$, and $ZrO_2$ must be avoided. Their respective contents must preferably be less than 0.05%.

The presence of chromium oxide in the presence of alkaline vapors would result in the formation of hexavalent chromium, which is particularly toxic. The presence of titanium oxide in the starting materials would result in the formation of an aluminium titanate phase, to the detriment of the spinel phase. This unstable titanate phase would itself result in poor behavior during a thermal cycle. The presence of zirconia would result in densification of the product and would not maintain the desired degree of porosity for the products of the invention.

Clearly, the invention is not limited to the implementations described and shown.

As an example, the surfaces of a product in accordance with the invention at the interface with gases may exhibit a plurality of obstacles to the flow of the gases, but may also be substantially flat and extend parallel to the flow of the gases.

The invention claimed is:

1. A fused cast refractory product obtained by a method comprising:
   fusing a starting charge to obtain a molten material; and
   casting and solidifying said molten material by cooling, wherein
   said fused cast refractory product has a chemical composition by weight, as percentages by weight based on the oxides:
   25%<MgO<30%;
   70%<$Al_2O_3$<75%;
   other species: <1%, and
   said fused cast refractory product having a total porosity of more than 10% and less than 30% and weighing more than 1 kg.

2. A product according to claim 1, including at least 70.5% of alumina ($Al_2O_3$).

3. A product according to claim 1, including less than 73% of alumina ($Al_2O_3$).

4. A product according to claim 1, including at least 27.5% of magnesia (MgO).

5. A product according to claim 1, including less than 29% of magnesia.

6. A product according to claim 1, including less than 0.5% of silica ($SiO_2$).

7. A product according to claim 1, including less than 0.2% of silica ($SiO_2$).

8. A product according to claim 1, including a lime (CaO) content of less than 0.6% and/or a sodium oxide ($Na_2O$) content of less than 0.4%.

9. A product according to claim 1, including a lime (CaO) content of 0.4% or less and/or a sodium oxide ($Na_2O$) content of 0.2% or less.

10. A product according to claim 1, having a total porosity of more than 15% and less than 25%.

11. A porous product according to claim 1, wherein at least a portion of the porosity of the product is constituted by pores which are tubular in shape.

12. A product according to claim 11, wherein the porosity is constituted by pores that are tubular in shape.

13. A product according to claim 11, wherein the tubular pore diameter is in the range 1 mm to 5 mm.

14. A product according to claim 13, wherein more than 80% by number of the tubular pores have a diameter of less than 2 millimeters.

15. A product according to claim 11, wherein the tubular pores have an orientation in a direction substantially perpendicular to a solidification front of the product.

16. A product according to claim 1, comprising more than 97% by weight of spinel ($Al_2O_3$-MgO).

17. A product according to claim 16, wherein said spinel is in the form of columnar crystals of spinel having an orientation in a direction substantially perpendicular to a solidification front of the product.

18. A product according to claim 16, wherein the spinel has a crystal size of more than 0.1 mm and less than 15 mm.

19. A product according to claim 16, wherein the spinel comprises crystals having a size that increases with distance from an outer surface of said product.

20. A product according to claim 1, comprising a plurality of branches of a height (h) that is in the range 100 mm to 600 mm, and/or of a length (l) that is in the range 10 mm to 600 mm, and/or of a thickness (e) that is in the range 15 mm to 60 mm.

21. A product according to claim 20, in which the ratio h/e of the height to the thickness of at least one branch is greater than 5, and/or the ratio l/e of the length to the thickness of at least one branch is more than 2.

22. A product according to claim 20, wherein pores are distributed homogeneously in the branches of the product.

23. A product according to claim 1, in the form of a cruciform part.

24. A product according to claim 1, wherein at least some surfaces of said product to be placed at an interface with hot gases or fumes exhibit obstacles.

25. A product according to claim 1, fabricated using a method including a step of casting a molten material into a mold.

26. A product according to claim 25, in which the mold is a mold in a plurality of parts.

27. A product according to claim 1, in which:
   26%<MgO<30%
   70%<$Al_2O_3$<74%
   as percentages by weight based on the oxides.

28. A regenerator of a furnace comprising a product according to claim 1.

29. The regenerator according to claim 28, wherein the refractory product is used as a packing element for a lower portion of a packing of said regenerator.

30. The regenerator according to claim 28, associated with a soda-lime glass furnace operating under reducing conditions.

* * * * *